United States Patent [19]
Kapron et al.

[11] 4,134,642
[45] Jan. 16, 1979

[54] OPTICAL FIBRE WITH INCREASED SECURITY

[75] Inventors: Felix P. Kapron, Richmond; Frederick D. King, Smiths Falls, both of Canada

[73] Assignee: Northern Telecom Limited, Montreal, Canada

[21] Appl. No.: 793,082

[22] Filed: May 2, 1977

Related U.S. Application Data

[62] Division of Ser. No. 677,760, Apr. 16, 1976, abandoned.

[51] Int. Cl.² .............................................. G02B 5/14
[52] U.S. Cl. ................................................. 350/96.33
[58] Field of Search ............ 350/96 WG, 96 B, 96 R, 350/96.33; 356/237

[56] References Cited

U.S. PATENT DOCUMENTS

| | | | |
|---|---|---|---|
| 3,372,969 | 3/1968 | Snitzer | 350/96 WG |
| 3,823,996 | 7/1974 | Kompfner et al. | 350/96.33 |
| 3,981,592 | 9/1976 | Williams | 356/237 |
| 4,000,416 | 12/1976 | Goell | 350/96 R |

*Primary Examiner*—John K. Corbin
*Assistant Examiner*—Stewart Levy
*Attorney, Agent, or Firm*—Sidney T. Jelly

[57] ABSTRACT

An optical fibre has a plurality of light conducting cores surrounded by a cladding layer of lower refractive index than the cores. A light conducting layer is on the cladding layer with a refractive index higher than that of the cladding layer, and a second cladding layer surrounds the light conducting layer and has a refractive index lower than that of the light conducting layer. Data signals can be propagated in the cores and a monitoring signal in the light conducting layer. Any attempt to tap the fibre to abstract data information results in aberration of the monitoring signal. Thus there is provided a secure optical fibre cable.

14 Claims, 12 Drawing Figures

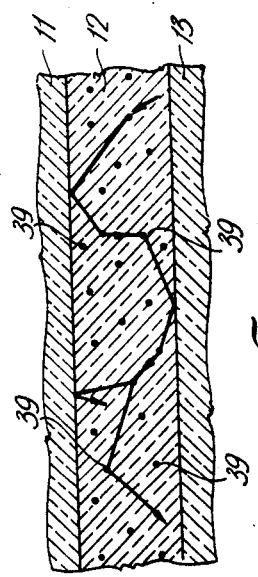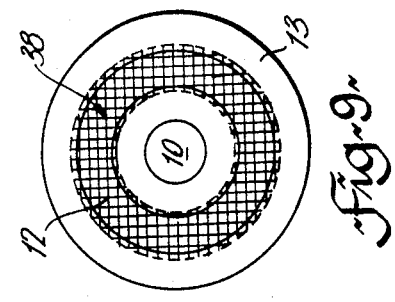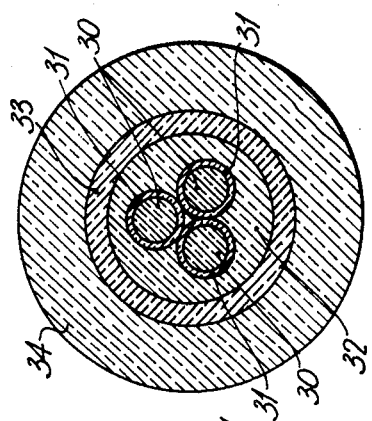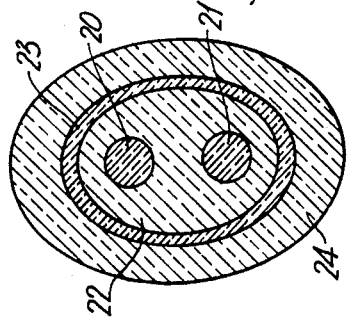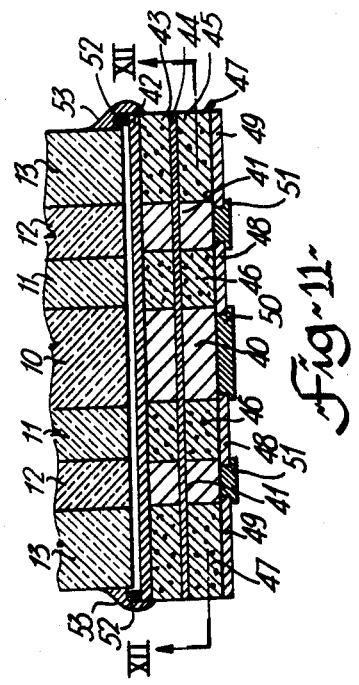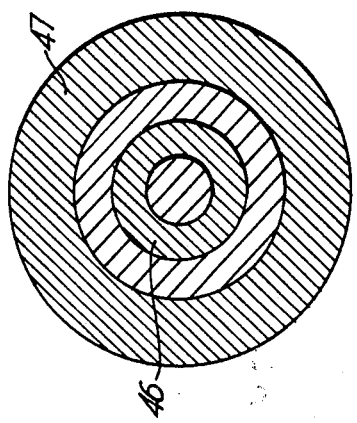

OPTICAL FIBRE WITH INCREASED SECURITY

This invention relates to an optical fibre with increased security, particularly against unauthorized abstract of information from the fibre and is a divisional of application Ser. No. 677,760, filed Apr. 16, 1976 now abandoned.

Several well known advantages of fibre-optic transmission systems include high information capacity, compactness, low attenuation, and immunity from atomic and electrical radiation. This last advantage is important for high electrical field environments, prevention of fibre crosstalk and security. However, an optical fibre can be tapped such that very little of the input data signal is extracted for amplification. If the perturbation on the signal is below the detectability of the receiver then the tap will go unnoticed.

There are several techniques for abstracting information from an optical fibre. Firstly, the cable, if such, is entered and the fibre jacketting is removed locally from a fibre. The fibre may be cut and an optical T inserted to extract some data signal. This relatively crude method will severely perturb the signal, especially at the time of the cut, and the tap would be readily detected at the receiver. A partial diagonal cut may reflect out a sufficient strength of signal. Alternatively the fibre cladding may be removed locally, chemically or mechanically, and some signal extracted, for example, with a contacting prism. This may go undetected. In a further alternative, the cladding is not removed and the extracting element obtains either evanescent light or radiated light. This latter method is even less susceptible to detection. Also, a local fibre diameter reduction, as in a taper, will release some higher order modes. The above techniques are enhanced by local stressing and/or bending the fibre appropriately.

Since some of the possible tapping methods may be undetected at the receiver, it is desirable to improve the possibility of detection and/or prevent a useful signal being abstracted. Generally the invention provides for the use of a monitoring signal separate from the data signal.

Thus a secure optical fibre comprises a light conducting core having a predetermined refractive index, a first cladding layer surrounding the core and having a refractive index lower than that of the core, a light conducting layer over the first cladding layer and having a refractive index higher than that of the first cladding layer, and a second cladding layer over the light conducting layer and having a refractive index lower than the light conducting layer.

Signal launching means can be positioned at one end of the core and detecting means at the other end of the core. Further signal launching means can be positioned at one end of the light conducting layer and a further detecting means can be positioned either at the same end of the light conducting layer at the launching means, or at the other end. If signal launching means and detecting means are at the same end, then a reflecting surface is formed on the other end of the light conducting layer.

The invention will be readily understood by the following description of certain embodiments by way of example, in conjunction with the accompanying drawings, in which:

FIGS. 2, 3, 4 and 5 are curves illustrating various alternative refractive index (n) profiles across the radius (r) of a fibre as in FIG. 1;

FIGS. 7 and 8 are diagrammatic cross-sections of alternative fibre formations embodying the invention;

FIG. 9 is a diagrammatic end view of a fibre, illustrating the provision of an end mirror;

FIG. 10 is a diagrammatic longitudinal cross-section through part of a fibre core and cladding illustrating index or reflecting centres in the cladding;

FIGS. 11 and 12 illustrate diagrammatically one form of signal launching and detecting device, FIG. 12 being a cross-section on the line XII—XII of FIG. 11 to a smaller scale.

Figure 1:
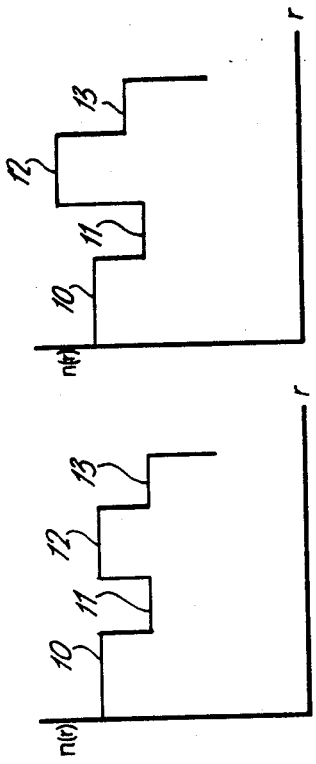
FIG. 1 is a diagrammatic illustration of one form of optical fibre, in accordance with the present invention.

As illustrated in FIG. 1, an optical fibre has a core 10 and successive layers 11, 12 and 13. The core 10 and layer 12 have a higher refractive index than the layers 11 and 13, which act as cladding layers. The thickness of the layer 11 is large enough to ensure optical isolation of the core 10 and layer 12 from each other. The core 10 and layer 12 serve as the guiding regions for two optical channels without crosstalk. The data signal is carried by the light rays 14 in the core 10 and the monitor signal is carried by the light rays 15 in the annular layer 12. Since the annular layer 12 surrounds the core 10 and since rays 15 are more sensitive to tapping techniques than are rays 14, a monitored secure fibre is established.

The invention provides a secure optical fibre transmission channel in which the data and monitor signals are spatially separated. Hence mode spreading and backscattering effects are avoided and the data and monitor discrimination sensitivity can be high. This allows long distances, bends, and codirectional or contradirectional data and monitor signals transmission. Launching and receiving are straightforward. In a codirectional system, that is with the data and monitor signals travelling in the same direction along the fibre, the transmitter could be a dot - ring light emitting diode or laser; the dot would inject the data signal into the core 10 while the ring would inject the monitor signal into the layer 12. The receiver could be a dot ring PIN or APD device. In the contradirectional system, that is with the monitor signal travelling in the opposite direction to the data signal, there could be a dot source and a ring detector at one end and a ring source and a dot detector at the other end of the fibre. Such arrangements are described in more detail later.

Figure 2:
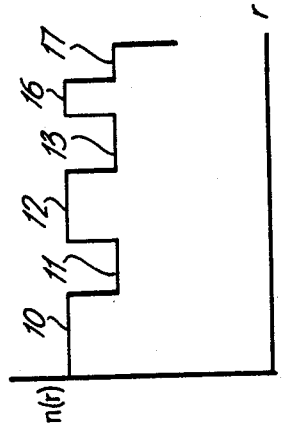
Figure 3:
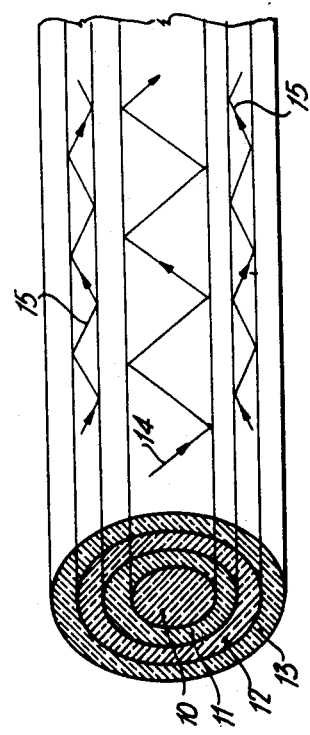

The particular form of the fibre, as in FIG. 1, can be varied. Thus, as illustrated in FIG. 2, the core 10 and each layer 11, 12 and 13 can have a constant refractive index, the index for core 10 and layer 12 the same, and the index for the layers 11 and 13 the same. As illustrated in FIG. 3, the refractive indexes for core and all layers are all different, but meeting the requirement that the indices for the core 10 and layer 12 are higher than the indices for the layers 11 and 13.

Figure 5:
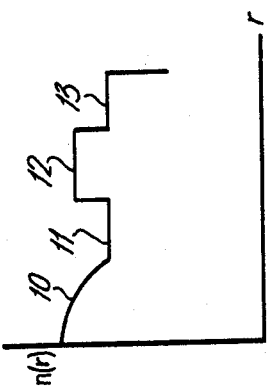

FIG. 4 illustrates a refractive index profile with the index for the core 10 higher than the index for the layer 12, while the indices for the layers 11 and 13 are the same, and lower than those for the core 10 and layer 12. This has the advantage of making the monitor signal more loosely bound than the data signal, thereby enhancing tap detectability. The core 10 may have a graded refractive index, to reduce modal dispersion, as illustrated in FIG. 5. The data light rays now follow quasi-sinusoidal paths rather than the zig-zag paths 14 in FIG. 1. Also, the layers 11 and/or 12 can have graded refractive indices, if desired.

Figure 6:
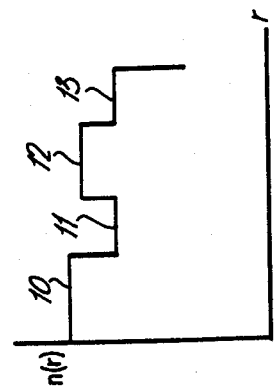
FIG. 6 is a curve illustrating the refractive index (n) profile of a further form of fibre.

FIG. 6 illustrates the refractive index (n) profile across the radius of an optical fibre, similar to that of FIG. 1, but having two additional layers, indicated at 16 and 17 in FIG. 6. The layers 12 and 16 carry monitor signals which may be the same or different. The two monitor signals may travel in the same direction or in opposite directions. This can be extended to multiple data signals and multiple monitoring signals.

In FIG. 7, two cores 20 and 21 carry independent data signals and are surrounded by a common cladding 22, a protective monitoring layer 23 and outer cladding 24. This can be applied to a cable concept, as illustrated in FIG. 8 in which three fibre cores 30, each either their own individual cladding layer 31, and with each core carrying a data signal, are surrounded by a cushioning material 32. A monitor layer 33, which can be a composite of layers, carries the monitor signal, and is surrounded by a further layer 34 of protection and strength.

The various refractive indices of the cores 20, 21 and 30, and the various layers 23, 31 and 33 can be constant or graded, and the number of layers can be increased if desired.

With codirectional signalling, that is data and monitor signals travelling in the same direction, data cannot easily be extracted without affecting the monitor signal. Contradirectional propagation is thus less suitable for those tapping methods that are sensitive to direction.

Codirectional data and monitor transmission may be preferred over the contradirectional type because it will generally result in more monitor signal being tapped out. This means a larger monitor noise-to-data ratio inflicted upon the intruder and a greater detection sensitivity for the operator. However, contradirectional signalling has the advantage of proximity of the monitor receiver to the data transmitter. This allows for convenient alarming for transmitter shutdown. In the codirectional case an alarming channel, probably electrical and itself subject to sabotage, is necessary. To utilize the advantages of both types of signalling, launching is codirectional with the monitor signal retro-reflected at the data output end and received back at the input end. It is also commented that a single tap will give rise to two perturbations in the monitor signal.

Retro-reflection is obtained by providing a reflective surface at the data output end for the monitor-signal-only layer or layers. FIG. 9 is an end view on a fibre, for example as in FIGS. 1 and 3, the same reference numerals applied, FIG. 9 illustrating, in the hatched area 38, a mirrored end formed by any method well known in the optical arts, for example metallization or dielectric layers, extending over the whole end area of the high index layer 12, and also extending slightly over the adjacent layers 11 and 13 to accommodate evanescent light. Reflectivity should be near unity.

The more loosely bound monitor signal can be made much stronger than the data signal. The tapped signal mix is then composed predominantly of monitor signal so that the ratio of data signal-to-monitor noise is very small. It is possible to make the ratio so small that the data signal portion of the total mixed signal is below noise level and is therefore unresolvable.

Monitor noise can be further enhanced by use of a noisy source with a bandwidth exceeding that of the data signal.

Alternatively, in the present invention, the monitor channel can itself add noise to the monitor signal via the introduction of fibre fluctuations into the monitor signal-only region. For example, in the embodiment of FIG. 1, the monitor signal can be scrambled by making the interfaces between layer 12 and layer 11 and/or between layer 12 and layer 13 such that they randomly scatter the monitor signal rays 15. This may be done by refractive index and/or boundary fluctuations at the interface. A typical example is to roughen the surface of layer 11 before forming layer 12 and then roughening the surface of layer 12 before forming layer 13.

Another method is to distribute scattering fluctuations throughout the layer 12 in FIG. 1, via tiny index or reflectivity centres. This is seen in FIG. 10 which illustrates in cross-section part of layer 12 and adjacent parts of layers 11 and 13 only, with index or reflective centres indicated at 39. While only illustrated two dimensionally, it will be appreciated that the effect is three dimensional and scattering occurs three dimensionally in layer 12.

Either method has the effect of inducing coupling amongst high order monitor modes. Hence rays 15 will experience randomly different path length down the fibre and any regularity in the monitor signal will be scrambled, or a noisy injected monitor signal made more noisy. An intruder will then find more difficult to separate the tapped noisy monitor signal from the weaker tapped data signal.

The tapped signal cannot then be resolved to yield the data; a security alarm may not be necessary. With a noisy monitor, an alarm would respond to the monitor DC level. In systems in which the tapped signal would be resolved to obtain a data signal, a detector can be provided to detect the relatively large perturbations of the monitor signal which would be occasioned by a tap. A detector could merely indicate that a fibre is tapped or could shut the system down.

Relatively large perturbations of the monitor signal will occur because a region in which only the monitor signal propagates must be crossed before access is obtained to the data signal region.

FIGS. 11 and 12 illustrate one particular arrangement for launching and/or detecting signals in the data and monitor channels. FIG. 11 is a cross-section on a plane parallel to and coincident with the axis of a fibre, illustrating a diode structure on the fibre end, and FIG. 12 is a cross-section on the line XII—XII of FIG. 11. Considering the arrangement as a transmitter-receiver, it comprises a circular p-n junction 40 and an annular junction 41 respectively aligned with the high index data region 10 and monitor region 12 respectively. The junctions consist of a "transparent" n-type GaAlAs substrate 42 and layer 43; a p- or n- type GaAs active layer 44; and a "transparent" p-type GaAlAs layer 45. Proton-bombarded annular regions 46 and 47 are of high electrical resistance and optical absorption so that electrical and optical isolation between junctions 40 and 41 is achieved. Insulating oxide annular areas 48 and 49 cover the bombarded regions 46 and 47 and metallic circular and annular areas 50 and 51 provide independent p-side contacts. The common n-side contact ring 52 is on the opposite of the device to p-side contacts, in the present example outside the fibre diameter to assist in aligning.

Alternatively the p-side contact is positioned opposite a low index region of the fibre, that is opposite 10 or 12, with which light is not coupled. A transparent epoxy 53 binds the fibre and device into a unit.

In operation, the junctions can emit under forward bias or detect under reverse bias. For example, if the p-contact 50 is made positive with respect to the n-contact 52, the circular junction 40 may be modulated to emit a data signal into the core 10 of the fibre. If the p-contact 51 is similarly biased, the annular junction 41 will emit a monitor signal into the region 12 of the fibre. This is suitable for the input end of a link with codirectional signalling. However, if p-contact 51 is made negative with respect to the n-contact 52, then the annular junction 41 can detect a monitor signal leaving the region 12 — this is the data input end of a link with contradirectional signalling. Obvious reversals of biases in both the above cases provides suitable operation for the other end of the link.

What is claimed is:

1. An optical fibre for a transmission system, comprising:
    at least two spaced apart parallel light conducting cores, each core having a predetermined refractive index for independent passage of signals therethrough;
    a first cladding layer surrounding all said cores and having a refractive index lower than said cores to provide optical isolation between said cores;
    a light conducting layer over said first cladding layer and having a refractive index higher than said first cladding layer for passage of a monitor signal independently of said cores; and
    a second cladding layer over said light conducting layer and having a refractive index lower than said light conducting layer.

2. An optical fibre as claimed in claim 1, said first cladding layer in contact with said cores.

3. An optical fibre as claimed in claim 1, each of said cores separately surrounded by said first cladding layer, a further layer of material surrounding said cores and their cladding layers, said light conducting layer over said further layer of material.

4. An optical fibre as claimed in claim 1, including a second light conducting layer over said second cladding layer and having a refractive index higher than said second cladding layer, and a third cladding layer over said second light conducting layer and having a refractive index lower than said second light conducting layer.

5. An optical fibre as claimed in claim 1, said cores having a constant refractive index.

6. An optical fibre as claimed in claim 1, including means for launching a signal into an input end of each core and a monitoring signal into an input end of said light conducting layer and means for detecting said signals at an output end of each of said cores and at an output end of said light conducting layer.

7. An optical fibre as claimed in claim 6, having an output end associated with the output ends of said cores, and a mirror at said output end, said mirror aligned with said light conducting layer, said input end of said light conducting layer congruent.

8. An optical fibre as claimed in claim 1, including signal scattering centres distributed throughout said light conducting layer.

9. An optical fibre as claimed in claim 1, including:
    light emitting means attached to an input end of the fibre, said light emitting means positioned to launch a separate and independent data signal into each light conducting core, and
    further light emitting means at one end of the fibre and positioned to launch a monitoring signal, separate from and independent of said data signals, into said light conducting layer.

10. An optical fibre as claimed in claim 9, including signal detecting means at an output end of the fibre, positioned to detect each data signal independently.

11. An optical fibre as claimed in claim 9, said further light emitting means positioned at said input end of said fibre.

12. An optical fibre as claimed in claim 9, said further light emitting means positioned at an output end of the fibre.

13. An optical fibre as claimed in claim 1, including a further signal detecting means at said output end of said fibre, positioned to detect said monitoring signal in said light conducting layer.

14. An optical fibre as claimed in claim 12, including a further signal detecting means at said input end of said fibre, positioned to detect said monitoring signal in said light conducting layer.

* * * * *